April 26, 1949.  J. W. GIBLER  2,468,055
LOAD DUMPING PALLET
Filed Nov. 28, 1945  4 Sheets-Sheet 1
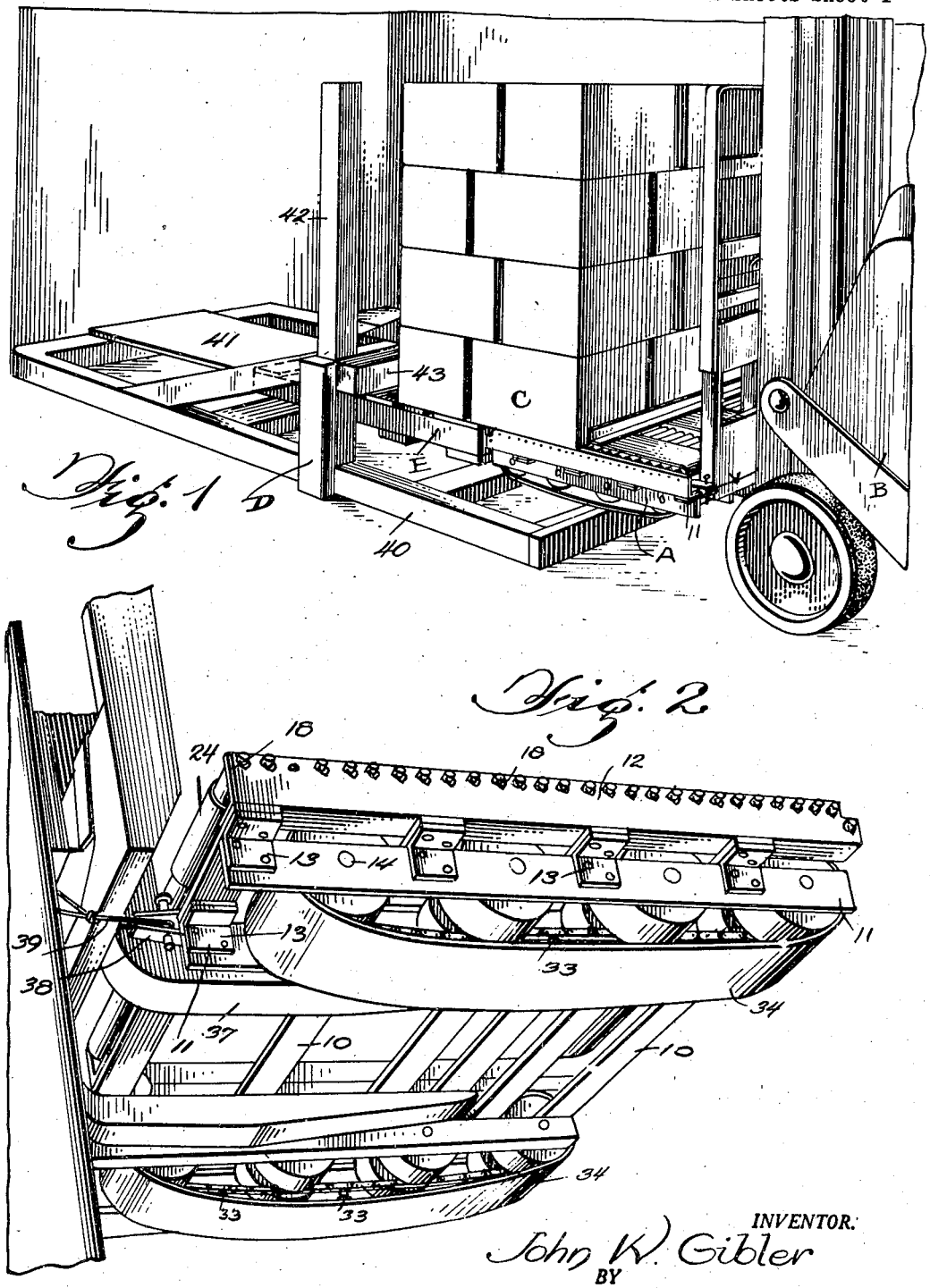
INVENTOR.
John W. Gibler
BY
W. J. Eccleston.
ATTORNEY

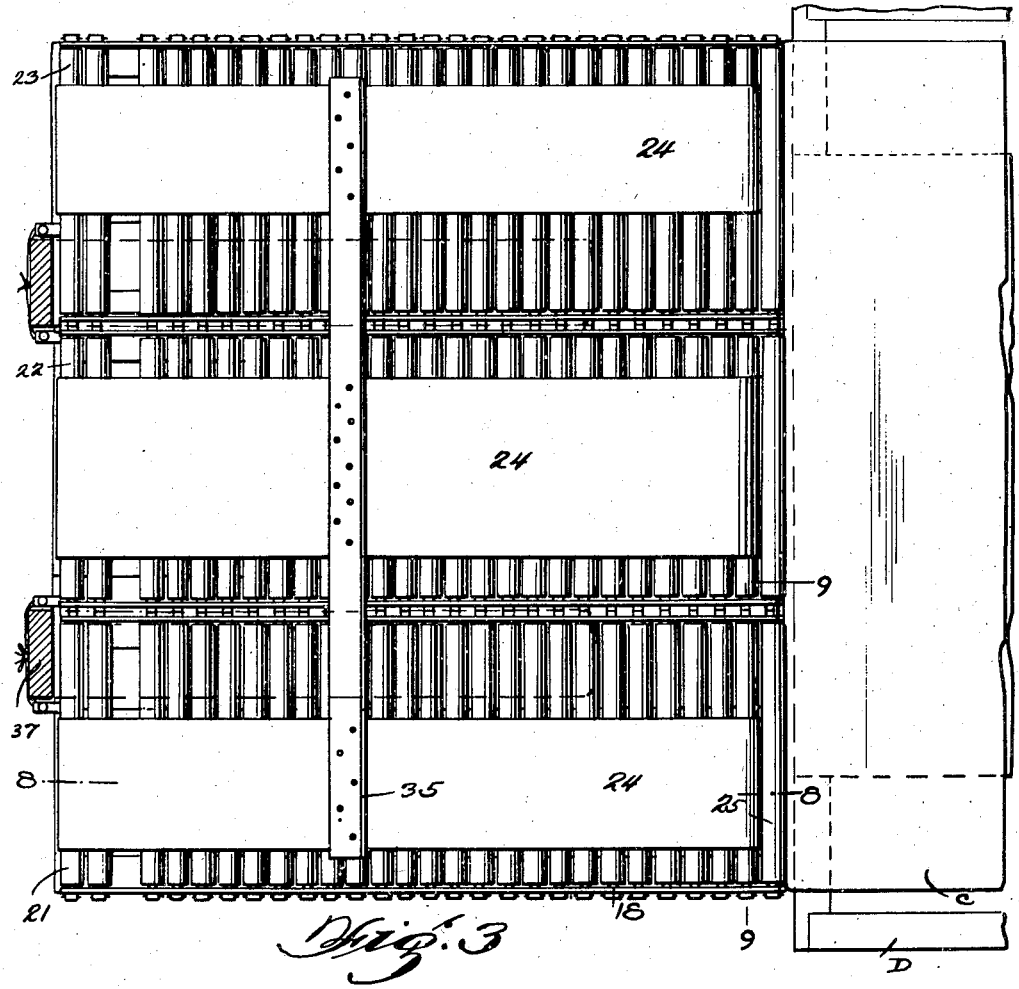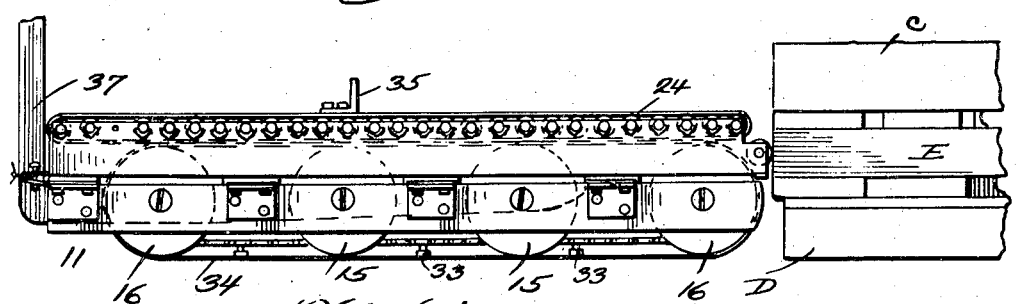

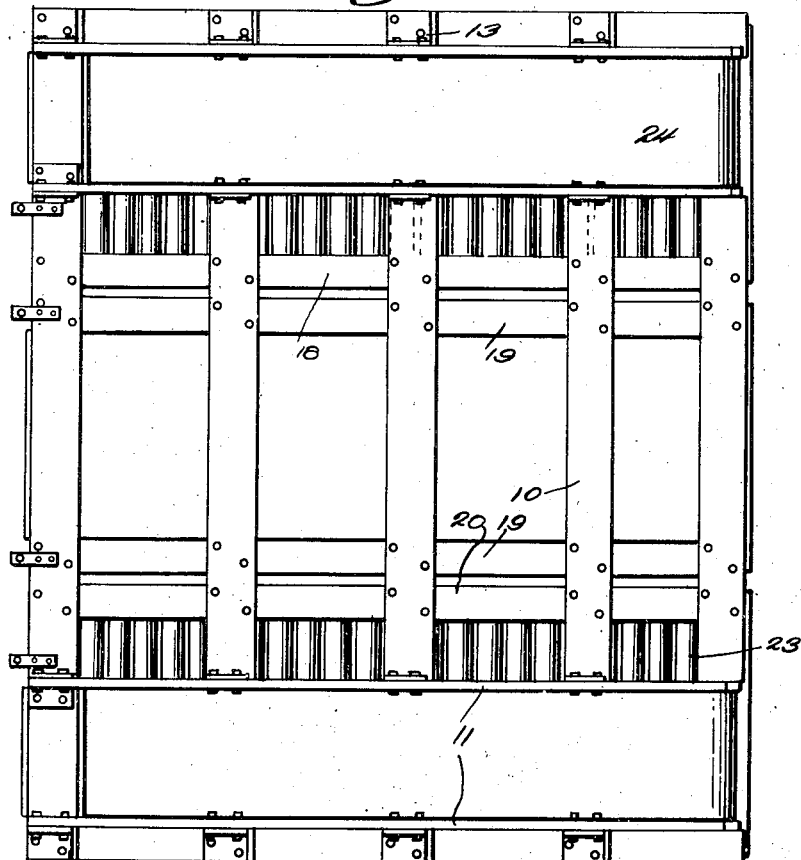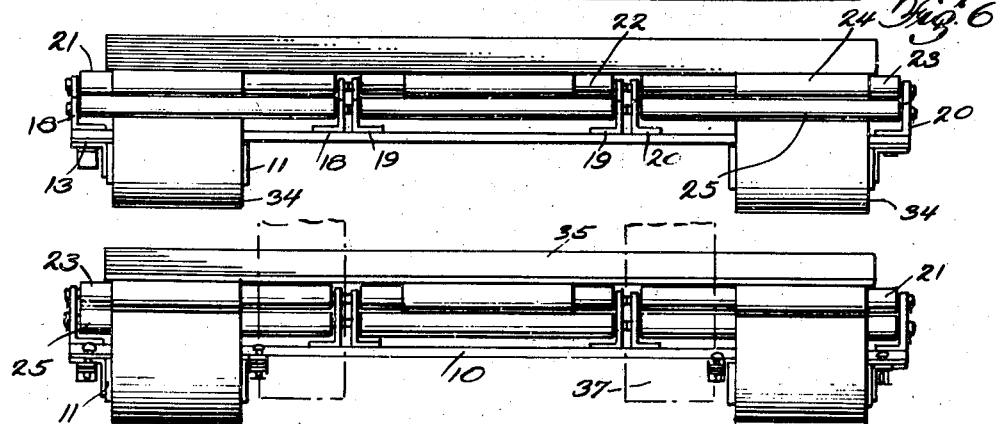

April 26, 1949. J. W. GIBLER 2,468,055
LOAD DUMPING PALLET
Filed Nov. 28, 1945 4 Sheets-Sheet 4

INVENTOR.
John W. Gibler
BY
W. J. Eccleston,
ATTORNEY

Patented Apr. 26, 1949

2,468,055

UNITED STATES PATENT OFFICE 2,468,055

LOAD-DUMPING PALLET

John W. Gibler, United States Army, Mattoon, Ill.

Application November 28, 1945, Serial No. 631,458

8 Claims. (Cl. 214—84)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The invention pertains to a new type of pallet having automatic loading and unloading means and adapted to be carried by a forklift truck as a temporary attachment.

It is an object of the invention to provide a pallet of the same length and breadth as the conventional pallet and provided with automatic means for picking up a load from a jig and unloading the load at any desired point either on a floor or in stacks or tiers.

It is a further object of the invention to provide a pallet which is temporarily fastened on the fork of a conventional forklift truck and which is provided with traction-operated means for loading and unloading the pallet.

It is a further object of the invention to provide a new type of platform or pallet adapted to be carried by a lift truck and having endless belts forming a load-supporting surface and having traction means for rotating said belts to load and unload the pallet when the lower surface of the pallet is resting on a supporting surface during movement of the truck.

Further objects of the invention will be apparent from a consideration of the following specification taken in connection with the accompanying drawings, in which:

Figure 1 is a perspective view of the pallet mounted on a forklift truck and picking up a load of boxes from a jig;

Figure 2 is a perspective view of the pallet carried by a forklift truck;

Figure 3 is a top plan view of the pallet as carried by a forklift truck;

Figure 4 is a side elevational view of the pallet as shown in Figure 3;

Figure 5 is a bottom plan view of the pallet;

Figure 6 is an elevational view of the forward end of the pallet;

Figure 7 is an end elevational view of the rear of the pallet;

Figure 8:
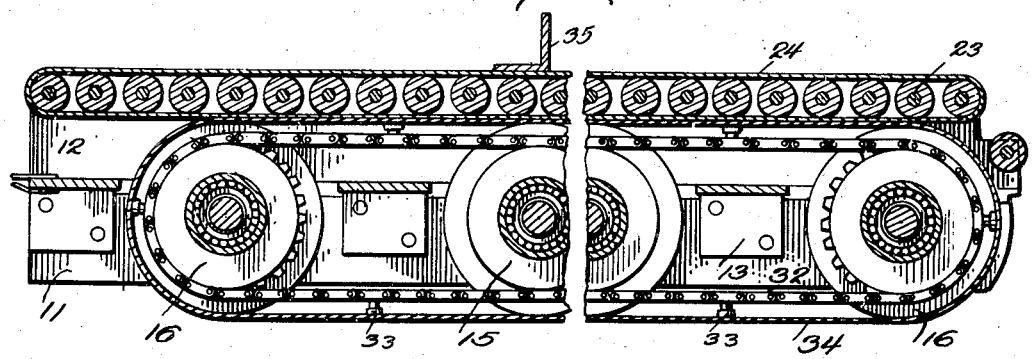
Figure 8 is a sectional view partly broken away on the line 8—8 of Figure 3.

As shown in Figure 1 of the drawings, A represents a load-dumping pallet according to my invention mounted on the fork of a lift truck B, and picking up a load of cartons C, from a special jig D, which is designed to support a load of cartons on an ordinary pallet E, in a slightly elevated position for transfer to the pallet A. The pallet A comprises a framework composed of transverse elements 10, secured to longitudinal elements 11 and 12 by means of angle plates 13 or other appropriate securing means. Two longitudinal members 11 extend beneath the transverse elements 10 on each side, and serve to support the axles 14 of idler rollers 15 and drive rollers 16 carrying traction belts 34. The members 10 are suitably spaced to allow the rollers to lie between them. On the upper surface of the framework are three pairs of longitudinal angle members 18, 19, and 20, each having one flange secured to the transverse members 10 and carrying three sets of idler rollers 21, 22, and 23. Each set of idler rollers carries a belt 24 forming part of the supporting surface of the pallet. A single roller 25 is carried at the forward end of each set of angle members 18, 19, and 20, and at a lower level, so that the space over the forward power roller 16 is filled and the load is guided onto the belts 24.

Figure 9:
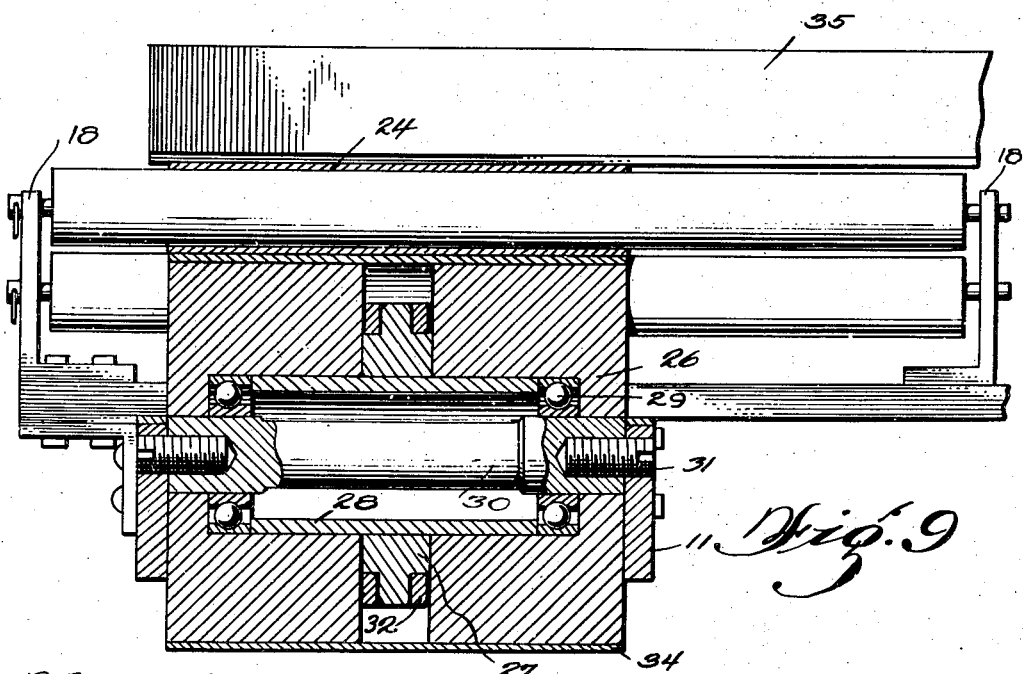
Figure 9 is a fragmentary sectional view on an enlarged scale on the line 9—9 of Figure 3.
Figure 10:
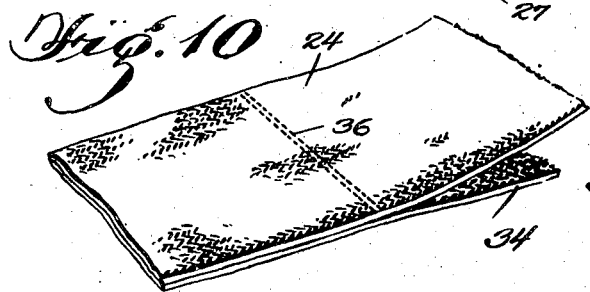
Figure 10 is a perspective view of parts of a load-carrying belt and its associated traction belt showing the connection between them.

The lower supporting members 11 carry power rollers 16 adjacent their ends and idler rollers 15 spaced between. The power rollers 16 as shown more particularly in Figure 9 comprise two belt-carrying sections 26 having a sprocket section 27 therebetween. The bearing and sprocket sections are secured to a sleeve 28 and mounted by means of ball bearings 29 on the axle 30, the axle being supported on studs 31 passing through the side members 11. The idler rollers 15 may be formed from a single block provided with a groove to receive the sprocket chain 32 or may be constructed similarly to the power rollers 16. A sprocket chain 32 is trained around the power rollers 16 and is guided on the idler rollers 15. The chain 32 is provided with spacers 33 secured to certain of the sprocket chain links to guide the chain with relation to the traction belt 34, which is trained around the power rollers 16 and idler rollers 15.

The two outer load-bearing belts 24 trained around the idler rollers 21 and 23 carried on the upper longitudinal angle members 18 and 20 are operated by their corresponding traction belts 34. A transverse angle member 35 is secured to the three load-bearing belts 24 and serves both to furnish power to the center load-bearing belt and as a pusher for the load. The traction belts are each stitched to their corresponding load-bearing belts along a transverse line 36 which is so located that the stitched section 36 travels back and forth above the transverse members 10 of pallet A, always remaining in the upper run of the traction belt 34 and the lower run of the corresponding load-bearing belt 24.

The pallet A is adapted to be carried on the fork 37 of a conventional forklift truck B and to be secured thereto by suitable means such as members forming an eye 38 and a flexible tying element 39. The forklift truck B is operated to pick up, carry and transfer loads while the pallet A remains mounted on the fork 37.

Since the pallet A is somewhat thicker than the ordinary wooden pallet E, which is not provided with load-transferring means, it is necessary to provide a special jig D to support a conventional pallet E so that its load may be transferred to the dumping pallet A described herein. The jig D comprises a frame 40 having a load-supporting conveyor 41 narrower than the space between the forks 37 of a lift truck. The conveyor 41 is supported in slightly raised position on the rectangular frame 40, which is provided with uprights 42 at opposite sides carrying a bar 43 between them at an elevation slightly above the height of a conventional pallet E resting on the conveyor 41.

When it is desired to transfer a load from a conventional pallet E to load-transferring pallet A, the pallet E with its load of cartons C, is placed on the conveyor 41 of the special jig D. The operator of the lift truck B which is equipped with the self-dumping pallet A approaches the loaded pallet E squarely, and pushes against the pallet as shown in Figure 1. The pallet E is moved from beneath its load under the transverse bar 43 of the jig, which acts as a stop for the cartons C, and the load is transferred to the pallet A at the same time. The cartons C engaging the pusher bar 35 of the pallet A tend to rotate the belts 24 in a direction to move the cartons onto the pallet, while at the same time the engagement of the traction belts 34 with the transverse members of the rectangular frame 40 of the jig D also propels the upper load-bearing surfaces of the belts 24 rearwardly.

When the load is entirely transferred to the dumping pallet A, it can be elevated by the lift truck and carried to any desired location where it can be unloaded either on the floor or on one of the upper levels of a stack or tier. To unload the cartons, the pallet A is lowered until its traction belts 34 come in contact with either the floor or the cartons of the stack or tier. The lift truck B is backed away, whereupon the traction belts 34 are operated by their frictional contact with the floor or the stacked cartons and drive the load-carrying belts or conveyors 21, 22, and 23 forwardly to cause the stack of cartons C to remain in place while the pallet A is withdrawn. When cartons are stacked without the interposed pallets E, as in railway cars or in storage for long periods, the piles are usually unloaded either against a wall or against a stack of cartons previously erected, and the contact of the stack being unloaded with such wall or pile of cartons maintains the vertical arrangement of the stack as the cartons drop off the pallet A onto the floor or lower tier of cartons.

Previously, when cartons were to be stacked without interposed wooden pallets E, it was necessary to perform the final unloading operation from the pallet or forklift truck manually. By means of my load-dumping pallet it is possible to deposit the loaded pallet of the old conventional type on the special jig and to pick up and transfer the load on my new dumping pallet without manual handling of the cartons. The load-dumping pallet is quickly adapted to and can be used with any conventional forklift truck, as the spacing of the traction belts 34 is such as to receive the forks 37 between them. The unobstructed space under the dumping pallet makes it possible to pick up the stacked cartons from my special jig, the load-supporting conveyor 41 of which is received between the forks 37 of the truck.

Other uses will be found for the load-dumping pallet in ordinary warehouse activities, and such modifications of the load-dumping pallet as will occur in adapting the pallet to additional uses are considered part of my invention as described in the following claims. For example, when the pallet is to be used for unloading on flat surfaces, such as floors, where the traction belts 34 remain in contact with the floor throughout their extent, it is possible to omit the sprocket and drive pulleys, since sufficient friction to operate the load-supporting belts is provided in such cases. The pallet can also be used to transfer furniture, machinery, and other articles, in such cases avoiding the use of cranes or other special pick-up mechanism.

Having thus described my invention, what I claim is:

1. A load-supporting pallet comprising a frame and upper and lower endless belts, corresponding pairs of said upper and lower belts being secured together along a transverse line, said lower belts adapted to engage a floor or the like.

2. A load-supporting pallet having a plurality of longitudinal endless load-carrying belts on its upper surface and having a pair of longitudinal traction belts at the outer edges of its lower surface, said traction belts being operatively connected to a pair of said load-supporting belts and the lower central portion of the pallet being unobstructed to receive the fork of a forklift truck.

3. An attachment for a forklift truck comprising a pallet having longitudinal traction means adapted to straddle the fork of the lift truck and to be brought into engagement with a floor or the like, and longitudinally movable load-supporting means operatively connected to said traction means.

4. A pallet having upper and lower longitudinally extending endless belts, the upper run of the lower belt and the lower run of the upper belt being adjacent and the belts being secured together along a transverse line, said lower belt being adapted to be brought into engagement with a floor or the like.

5. A pallet comprising a frame, upper and lower sets of rollers mounted thereon, and upper and lower endless belts mounted on said sets of rollers with their adjacent runs in contact, said adjacent runs being secured together along a transverse line, and said upper belt being provided with a transversely extending pusher, and said lower belt adapted to be brought into engagement with a floor or the like.

6. A pallet comprising a frame carrying three longitudinally extending load-supporting conveyors and two traction belts, the traction belts being located below the outer two conveyors and being connected thereto, the central conveyor being secured to the outer conveyors for operation and the space beneath the central conveyor being unobstructed to receive the forks of a forklift truck.

7. In combination, a fork-lift truck and a pallet secured to the fork thereof, said pallet including a conveyor in its upper portion and traction means in its lower portion for operating the conveyor when the pallet is moved horizontally on the surface with which it is in contact.

8. An attachment for a forklift truck comprising a pallet adapted to be secured to the fork thereof, longitudinally-extending traction means on the lower portion of the pallet and adapted to be brought into engagement with a floor or the like, and a longitudinally-extending conveyor on the upper portion of the pallet and operatively connected to the longitudinally-extending traction means.

JOHN W. GIBLER.

REFERENCES CITED

The following references are of record in the file of this patent:

UNITED STATES PATENTS

| Number | Name | Date |
|---|---|---|
| 1,072,571 | Canham | Sept. 9, 1913 |
| 1,093,444 | Lewis et al. | Apr. 14, 1914 |
| 1,256,196 | Beisner | Feb. 12, 1918 |
| 1,425,727 | Wallstrom | Aug. 15, 1922 |
| 1,519,340 | Smith | Dec. 16, 1924 |
| 1,556,262 | Streeter | Oct. 6, 1925 |
| 1,628,389 | Cochran | May 10, 1927 |
| 1,629,771 | Young | May 24, 1927 |
| 1,849,385 | Sekulski | Mar. 15, 1932 |
| 1,896,543 | Gfrorer | Feb. 1, 1933 |
| 1,903,488 | Stibbs | Apr. 11, 1933 |
| 1,932,955 | Coppinger | Oct. 31, 1933 |
| 2,089,516 | West et al. | Aug. 10, 1937 |
| 2,119,424 | Douglas et al. | May 31, 1938 |
| 2,388,458 | Alfonte | Nov. 6, 1945 |
| 2,412,155 | Jessen | Dec. 3, 1946 |

FOREIGN PATENTS

| Number | Country | Date |
|---|---|---|
| 503,267 | Great Britain | Apr. 4, 1939 |
| 471,071 | Germany | Feb. 2, 1929 |